(12) United States Patent
Nania

(10) Patent No.: US 10,173,506 B2
(45) Date of Patent: Jan. 8, 2019

(54) FLEXIBLE POWERED TONNEAU COVER FOR A PICKUP TRUCK BED

(71) Applicant: FORD GLOBAL TECHNOLOGIES, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 15/354,374

(22) Filed: Nov. 17, 2016

(65) Prior Publication Data
US 2018/0134132 A1 May 17, 2018

(51) Int. Cl.
| | |
|---|---|
| *B60J 11/00* | (2006.01) |
| *B60J 7/06* | (2006.01) |
| *B60P 7/04* | (2006.01) |
| *B60J 10/25* | (2016.01) |
| *B60J 10/90* | (2016.01) |

(52) U.S. Cl.
CPC ............... *B60J 7/068* (2013.01); *B60J 10/25* (2016.02); *B60J 10/90* (2016.02); *B60J 11/00* (2013.01); *B60P 7/04* (2013.01); *B60Y 2200/14* (2013.01)

(58) Field of Classification Search
CPC ....... B60Y 2200/14; B60J 7/068; B60J 10/25; B60J 10/90
See application file for complete search history.

(56) References Cited

U.S. PATENT DOCUMENTS

| | | | |
|---|---|---|---|
| 4,479,677 A | 10/1984 | Gulette et al. | |
| 4,717,196 A | 1/1988 | Adams | |
| 5,257,850 A | 11/1993 | Brim | |
| 6,053,556 A | 4/2000 | Webb | |
| 6,568,732 B2 | 5/2003 | De Gaillard | |
| 7,484,790 B2 | 2/2009 | Wheatley | |
| 2011/0169296 A1* | 7/2011 | Schrader | B60J 7/102 296/100.15 |
| 2015/0307014 A1* | 10/2015 | Alder | B60J 7/085 296/98 |

(Continued)

FOREIGN PATENT DOCUMENTS

| | | | | |
|---|---|---|---|---|
| CA | 2763155 A1 * | 7/2013 | ............. | B60J 7/085 |
| JP | 11286243 A | 10/1999 | | |

OTHER PUBLICATIONS

English Machine Translation of JPH11286243A.

*Primary Examiner* — Lori L Lyjak
(74) *Attorney, Agent, or Firm* — Jason Rogers; King & Schickli, PLLC

(57) ABSTRACT

An apparatus for covering a pickup truck bed is provided. The apparatus includes a flexible cover for selectively extending to at least partially cover the pickup truck bed and at least partially retracting to form a roll. A first motor is provided for extending the flexible cover, and a second motor is provided for driving the roll to retract the flexible cover. A front wall adjacent to an operator's cab of the pickup truck may include a housing for the roll. The flexible cover may include at least one support extending transverse to a travel direction secured at least partially within a pocket formed therein. A water management system may be provided for keeping water from entering the bed. A controller may tie operation of the flexible cover to the operation of any of a light, a tailgate, a remote control, or a control connected with the vehicle.

20 Claims, 11 Drawing Sheets

(56) References Cited

U.S. PATENT DOCUMENTS

| | | | |
|---|---|---|---|
| 2016/0236552 A1* | 8/2016 | Hannan | B60J 7/068 |
| 2017/0144519 A1* | 5/2017 | Searfoss | B60J 7/085 |
| 2017/0210214 A1* | 7/2017 | Weltikol | B60J 7/141 |
| 2018/0043759 A1* | 2/2018 | Rohr | B60J 7/1621 |

* cited by examiner

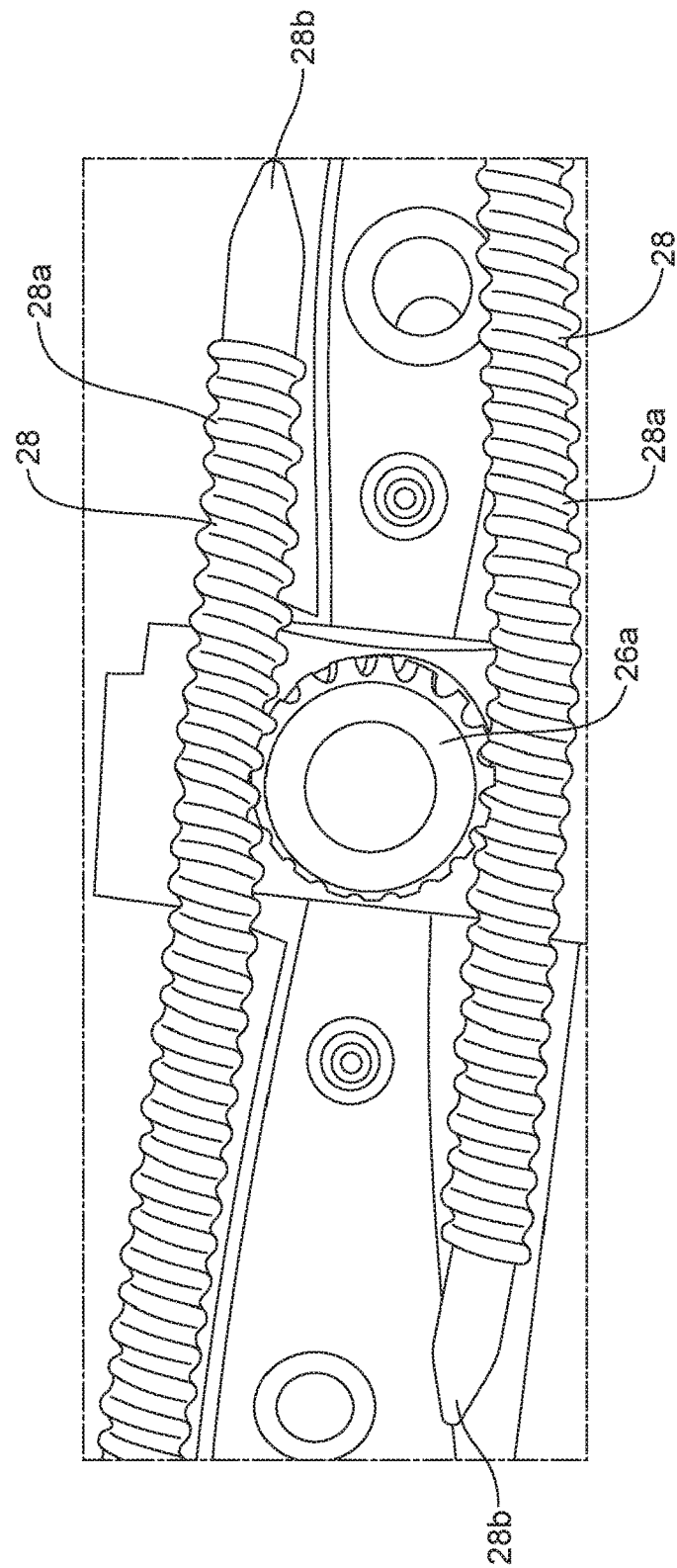

US 10,173,506 B2

FLEXIBLE POWERED TONNEAU COVER FOR A PICKUP TRUCK BED

TECHNICAL FIELD

This document relates generally to the motor vehicle field and, more particularly, to a flexible powered tonneau cover for selectively covering a bed of a pickup truck.

BACKGROUND

Often, it is desirable to cover a pickup truck bed when not in use to keep out debris and moisture. Past approaches have involved the use of "tonneau" covers. Such covers may be comprised of rigid panels that must be manually removed to gain access to the bed. Once removed, the rigid panels must also be stowed, which if done in the bed creates limitations on available storage space. Typical after-market covers are also not fully integrated with the pickup truck, and thus are prone to undesirable leakage.

Accordingly, a need is identified for an improved tonneau cover for a pickup truck bed.

SUMMARY

In accordance with the purposes and benefits described herein, an apparatus for covering a pickup truck bed is provided. The apparatus comprises a flexible cover for selectively extending to at least partially cover the pickup truck bed and at least partially retracting to form a roll. A first motor is provided for extending the flexible cover. A second motor is also provided for driving the roll to retract the flexible cover.

In one embodiment, a flexible cable is connected to the flexible cover, and the first motor is adapted for engaging the flexible cable to extend the flexible cover. A guide tube may be provided for at least partially receiving the flexible cable. The cover may include at least one cross bow for supporting the flexible cover when extended over the pickup truck bed and form part of the roll when the flexible cover is fully retracted. The at least one cross bow may be secured within a pocket in the flexible cover. A flexible seal may be provided for sealing between a sidewall partially forming the pickup truck bed and the flexible cover. A cap for a sidewall partially forming the pickup truck bed may also be provided with a drain path for draining water away from the pickup truck bed. A controller may also be provided for tying operation of the flexible cover to the operation of one or more of a light, a tailgate, a remote control, or a control connected to the pickup truck (such as in the operator's cab). A controller may also control the first motor to halt and the second motor to continue to drive the roll to pull the cover taut when extended.

According to a further aspect of the disclosure, an apparatus for covering a pickup truck bed is provided which includes a flexible cover for selectively extending in a travel direction to at least partially cover the pickup truck bed and retracting to at least partially expose the pickup truck bed. The flexible cover includes at least one pocket. At least one support, such as a cross bow, extends transverse to the travel direction and is secured at least partially within the pocket. A motor is also provided for extending and retracting the flexible cover.

In one embodiment, the motor comprises a first motor for extending the cover. The apparatus may further include a second motor for retracting the cover to form a roll. A controller may also be provided for tying operation of the flexible cover to the operation of one or more of a light, a tailgate, a remote control, or a control connected to the truck.

According to a further aspect of the disclosure, an apparatus for transporting cargo is provided. The apparatus comprises a pickup truck including a bed for receiving the cargo. The bed is at least partially defined by a front wall adjacent to an operator's cab of the pickup truck. A flexible cover is provided for selectively extending to at least partially cover the pickup truck bed and at least partially retracting to form a roll. A housing including the roll is connected to the front wall.

In one embodiment, a motor for extending the flexible cover is at least partially within the housing. A motor may also be provided for rotating the roll, which motor may also be at least partially within the housing. Sidewalls forming the sides of the pickup truck bed may further include including caps adapted for being secured to the sidewalls. The caps may be adapted for guiding the flexible cover. Each cap may provide a drain path for guiding water away from the bed. A controller may tie operation of the flexible cover to the operation of one or more of a light, a tailgate, a remote control, or a control connected to the truck.

BRIEF DESCRIPTION OF THE DRAWING FIGURES

The accompanying drawing figures incorporated herein and forming a part of the specification, illustrate several aspects of a powered tonneau cover for a pickup truck bed and, together with the description, serve to explain certain principles thereof. In the drawing figures:

FIG. 3A is a partially cutaway top view illustrating the flexible cables in connection with a drive gear;

Reference will now be made in detail to the present preferred embodiments of a flexible powered tonneau cover for a pickup truck bed, examples of which are illustrated in the accompanying drawing figures.

DETAILED DESCRIPTION

Figure 1:
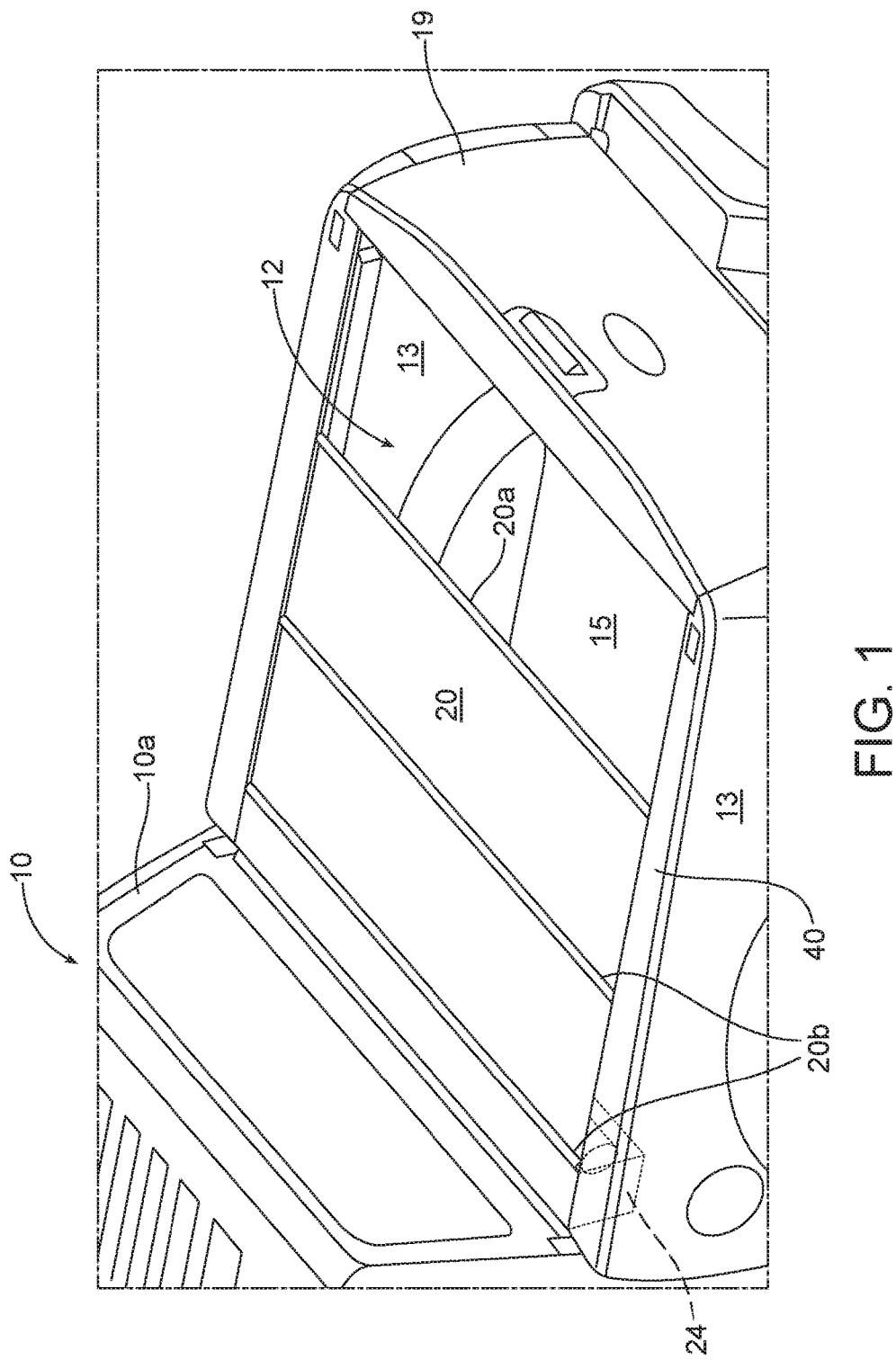
FIG. 1 is a partially cutaway perspective view of a pickup truck having a bed partially covered by a flexible tonneau cover.
Figure 2:
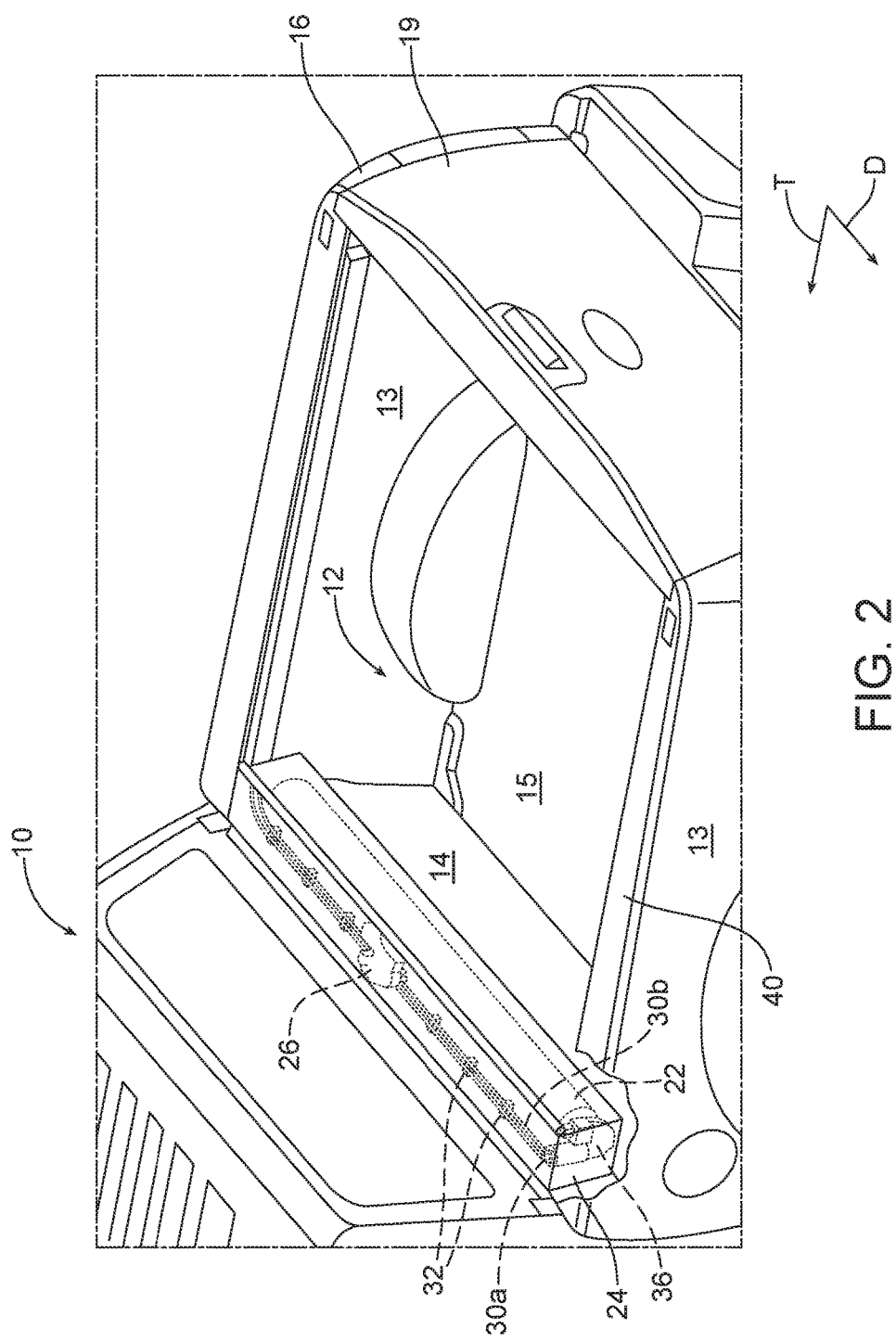
FIG. 2 is a view similar to FIG. 1, illustrating the flexible supports for supporting the cover and the motors for extending and retracting the cover.

With reference now to FIGS. 1 and 2, a pick-up truck 10 includes a cargo bed 12 (sometimes referred to as a "box") forming the rearward portion thereof, typically behind a passenger cab 10a. The cargo bed 12 includes generally vertical, upright sidewalls 13 spaced apart in a direction transverse T to a travel direction D of the pickup truck 10, a front wall 14, and a floor 15. The frame of the pickup truck 10 includes a generally vertical D-pillar 16 located at the rearward end of the cargo bed 12 adjacent the pivotable tailgate 19. The tailgate 19 extends transversely above the floor 15 between the sidewalls 13 at the rearward-most portion of the cargo bed 12. The tailgate 19 is pivotally mounted relative to the floor 15 and is movable between an upright closed position oriented perpendicularly to the floor 15 and generally opposite the front wall 14, and a lowered open position that forms an extension of the floor 15 rearwardly of the sidewalls 13.

According to one aspect of the disclosure, a flexible, powered tonneau cover 20 is provided for selectively extending over the bed 12 to cover it, and for being retracted to expose it. In the illustrated embodiment, the retraction and extension may be achieved by one or more motors for extending the cover 20 from a roll 22 in a housing 24 secured to the pickup truck 10. The motor(s) may move the cover 20 from the roll 22, though an opening 24a in the housing 24 (see also FIG. 7) to an extended position (partly extended condition shown in FIG. 2, but it will be understood upon reviewing the description that follows that the leading edge 20a of the cover 20 may extend to the tailgate 19 in the upright condition and form a seal to prevent the ingress of dirt or moisture).

Figure 3:
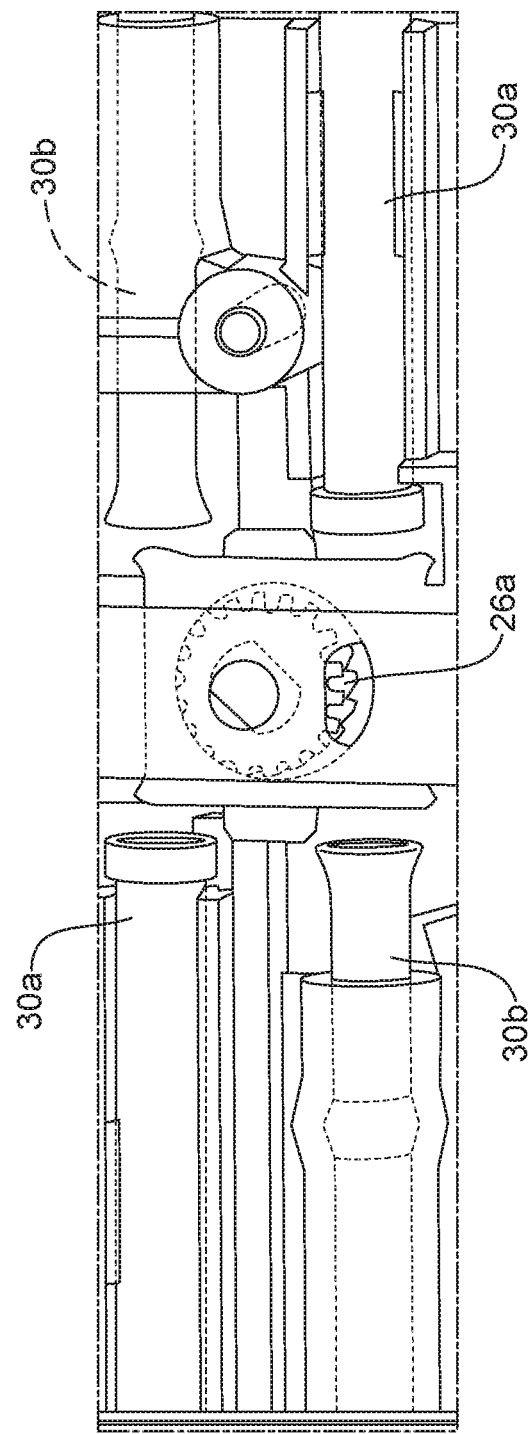
FIG. 3 is a partially cutaway top view illustrating guide tubes for guiding flexible cables for extending and retracting the cover.

With specific reference to FIGS. 2, 3, and 3A, the manner in which one or more motors may operate to extend and retract the cover 20 is explained. In the illustrated embodiment, a first motor 26 is provided, which may be partly or fully within the housing 24. This motor 26 may advance and retract one or more flexible cables 28 attached to the cover 20. In the illustrated embodiment, a pair of cables 28 are provided, each for moving to and fro within forward and return guide tubes 30a, 30b, which may be supported by supports 32 within the housing. Specifically, one guide tube 30a may guide each cable 28 as it moves to extend the cover 20, and the other guide tube 30b may receive the cable 28 as the cover 20 is retracted. As perhaps best shown in FIG. 3A, which omits the guide tubes 30a, 30b, each cable 28 may include a helical or spiral protrusion 28a, which may engage a corresponding gear 26a driven by the motor 26 to move the cable 28 and, hence, the cover 20. The cables 28 may also include tapered ends 28b to facilitate traversing the forward guide tube 30a during the advance to extend the cover 20.

To assist in the retraction of the cover 20, a second motor 36 may also optionally be provided. The second motor 36 may also be located partly or fully within the housing 24, and may be adapted to cause the roll 22 to rotate (such as, for example, by rotating a support forming part of the cover 12, as discussed below, to wind the cover around it and thus form the roll, which support may be rotatably supported at the ends within housing, such as by bearings (not shown)). The second motor 36 may be activated during the retraction of the cover 20 to assist the first motor 26, but would not be used to advance the cover 20 toward the deployed or extended position.

From FIG. 2, in which the flexible cover 20 itself is not shown, it can also be appreciated that a plurality of transverse supports in the form of cross bows 20b may be provided for supporting the cover. As perhaps best understood from FIGS. 1 and 4, each cross bow 20b may be secured within a pocket 20c of the cover 20. Each pocket 20c may be created by stitching the flexible material (e.g., fabric) accordingly. The cross bows 20b thus lend stiffness to the cover to help prevent it from bowing intermediate the sidewalls 13, and yet may be taken into housing 24 when retracted to form the roll 22.

Figure 4:
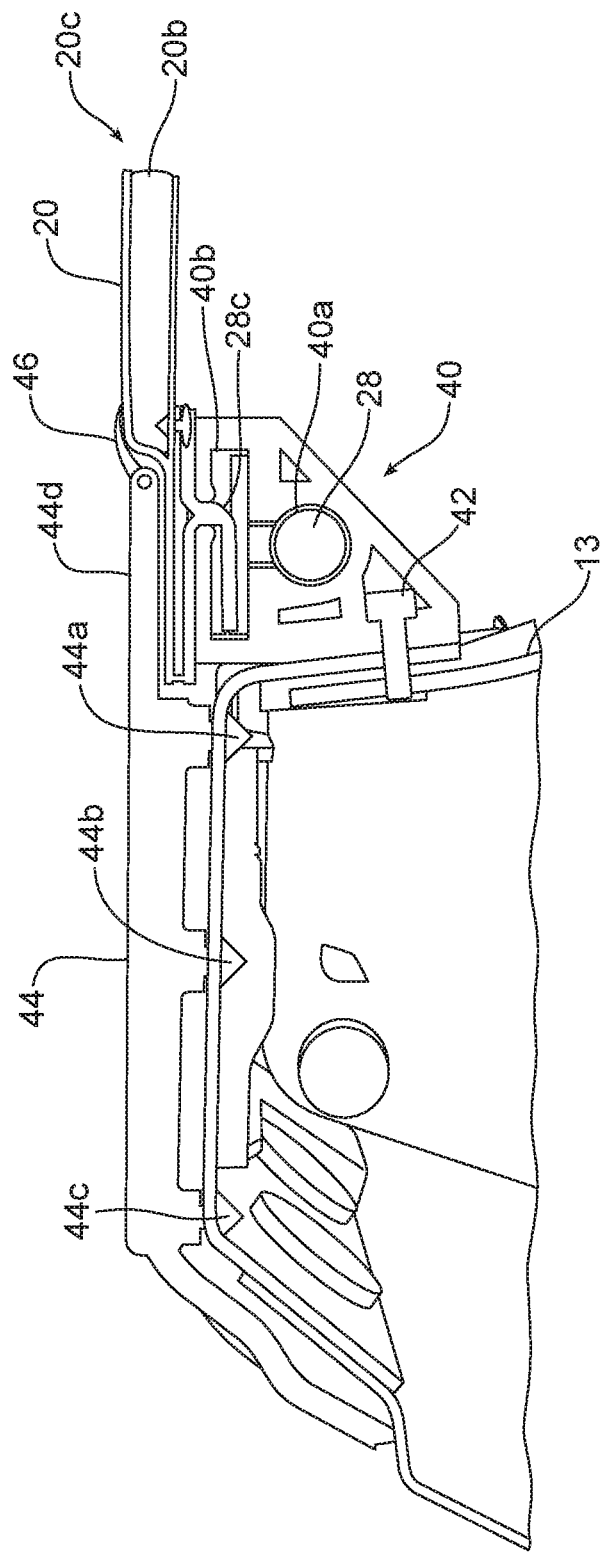
FIG. 4 is a partially cutaway, cross-sectional side view of a sidewall forming part of the truck bed including a cap for covering the sidewall and at least partially covering and guiding the cover during extension and retraction.
Figure 5:
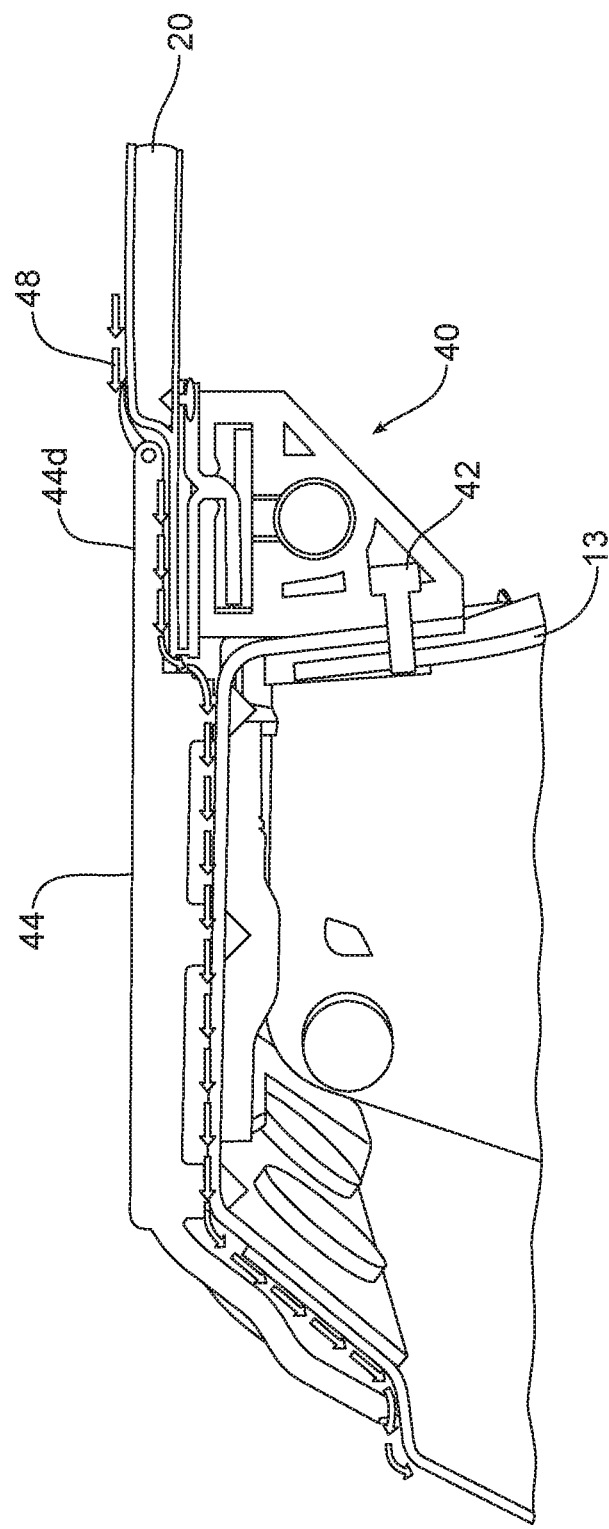
FIG. 5 is a view of the cap of FIG. 4, illustrating a drain path provided for draining water away from the bed.

Referring now to FIGS. 4 and 5, it can be understood that guide rails 40 may be provided along each sidewall 13 of the bed 12 to assist in guiding the cover 20 between the extended and retracted conditions. As can be seen in FIG. 2, the guide rail 40 may include a first channel 40a for receiving and guiding the cable 28, such as by way of attachment to an intermediate part 28c connected to the cover 20 via a second channel 40b. As perhaps best understood with reference to FIGS. 4 and 5, the guide rail 40 may be secured to the sidewall 13 of the truck 10 via transverse fasteners 42 (which may use the same openings in the sidewall for securing an existing trim or cap in place, thus providing for ease of manufacture as an optional feature, or possibly as a retrofit). A suitable gasket may also be provided along the entire guiderail 40 to help prevent liquid moisture from passing into the bed 12 from an above location.

To help prevent the ingress of water into the bed 12 and thus help keep any cargo dry, a water management system may also be provided. This system may include a cap 44, which may be fastened to the sidewall 13 using one or more integral, expandable fasteners (three fasteners 44a, 44b, 44c shown, but fewer or more may be used depending on the application) for engaging openings in the upper portion of the sidewall 13. The cap 44 may include an extended portion 44d that captures the cover 20 between the cap and the guide rail 40, and thus forms a guide channel for guiding the cover during extension and retraction along the bed 12. A seal, such as a flexible rubber lip 46, may also extend from the portion 44d to the upper surface of the cover 20 when present, and may simply flex or pivot to a resting position when the cover is not present. The cap 44 may be designed to be color-matched or otherwise aesthetically pleasing if it forms the exposed top of the sidewall 13, as illustrated, but it could also form an intermediate part between an upper portion of the sidewall 13 and a trim member, which could be adapted to connect to the cap 44.

Thus, as can be appreciated from FIG. 5 by the action arrows A, any liquid such as water that passes the seal 46 may be guided along a drain path 48 through the interior of the cap 44 (including around any gaskets or seals associated with the fasteners 44a closest to the bed to prevent water from entering the portion of the sidewall 13 closest to the bed 12). The drain path 48 may extend through the cap 44, including around the fasteners 44a, 44b, 44c (which may be provided in spaced groups along the sidewall 13 in the travel direction D), and thus deliver any liquid to a location external to the bed 12, such as along the outboard side of the pickup truck 10. In this manner, liquid is prevented from entering the bed 12 along the sidewalls 13 when the cover 20 is deployed.

Figure 6:
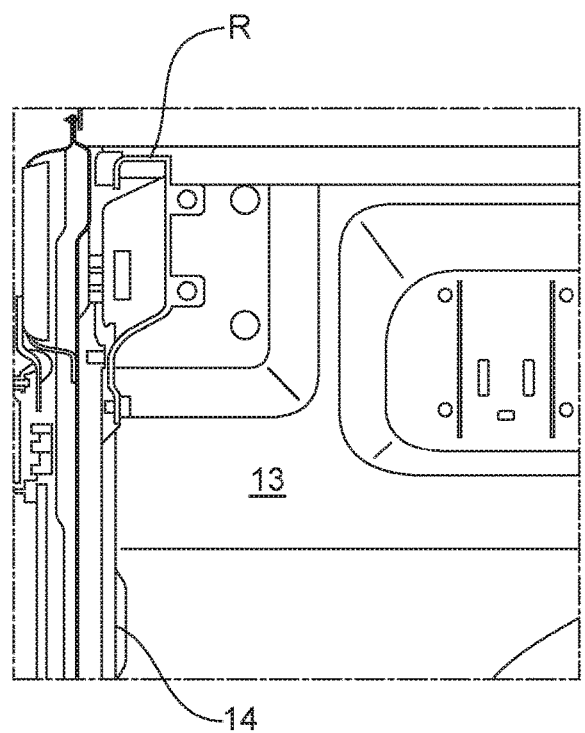
FIGS. 6 and 7 illustrate the manner in which a housing including a roll and the motors for extending and retracting the cover may replace a conventional front rail connected to a front wall forming part of the bed.

Referring now to FIG. 6, it can be understood that the front wall 14 adjacent to the cab 10a is typically provided with a rail R, which may help to stabilize the sidewalls 13 and lend strength and rigidity to the truck 10, and the bed 12 in particular. As can perhaps be best appreciated by viewing FIGS. 2 and 7 together, the housing 24 may replace this rail R to lend support for the sidewalls 13, while also providing for a convenient location to store the roll 22 that is fully formed when cover 20 is not in use. As such, the housing 24 thus performs dual functions, as compared to the rail R, and also allows for possible ease of use in a retrofit situation or as a manufacturing option by simply substituting parts with similar dimensions and configurations without compromising the robustness of the resulting arrangement.

Figure 7:
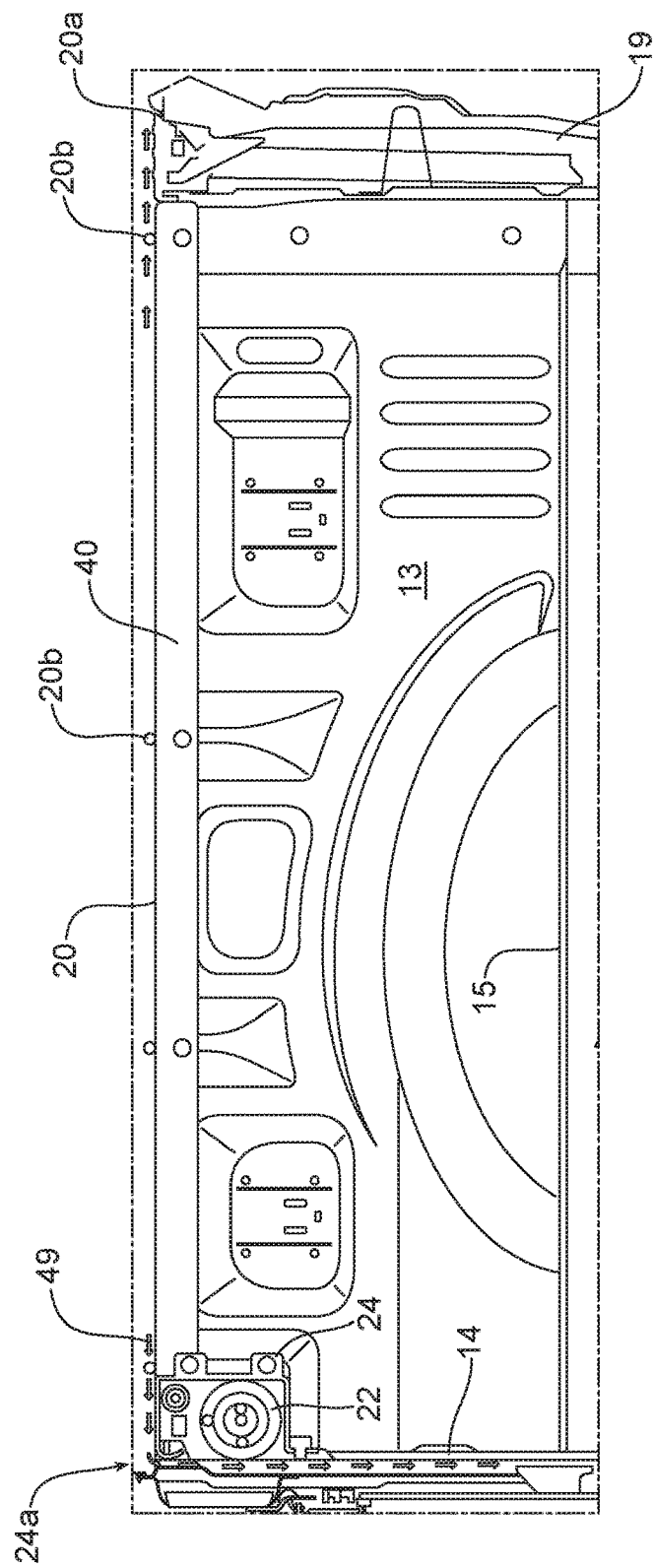

FIG. 7 further illustrates the manner in which the cover 20 may enter the housing 24 through an opening 24a along the rear portion thereof (but with part of the cover remaining extended at all times and associated with guide rails 40 to allow for ease of extension). This illustration also depicts how the cover 20 itself may guide liquid rearward of the front wall 14 through a drain path 49, thereby preventing it from entering the bed 12.

Figure 8:
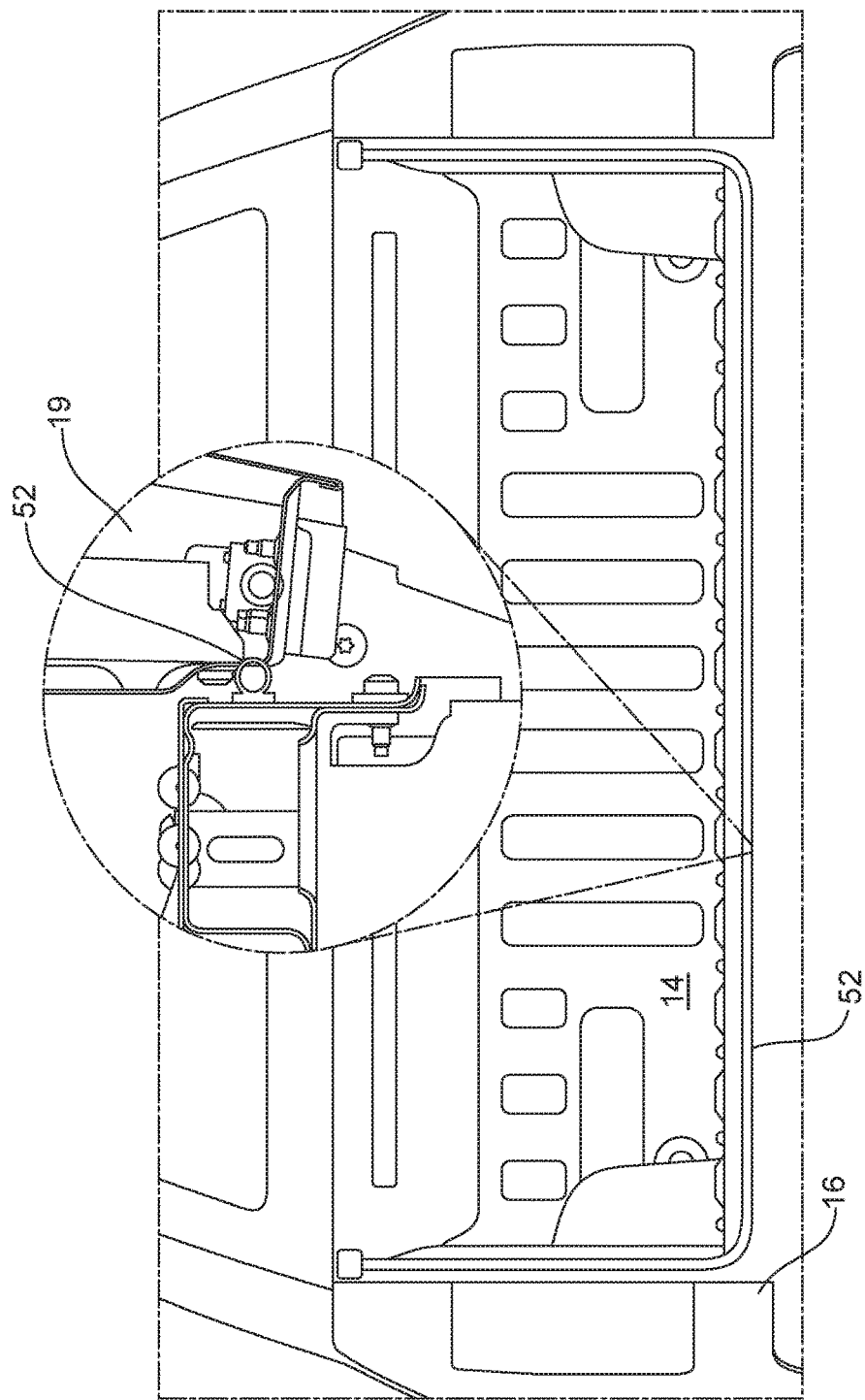
FIGS. 8 and 9 illustrate further aspects of seals for sealing the cover to prevent moisture from entering the bed.
Figure 9:
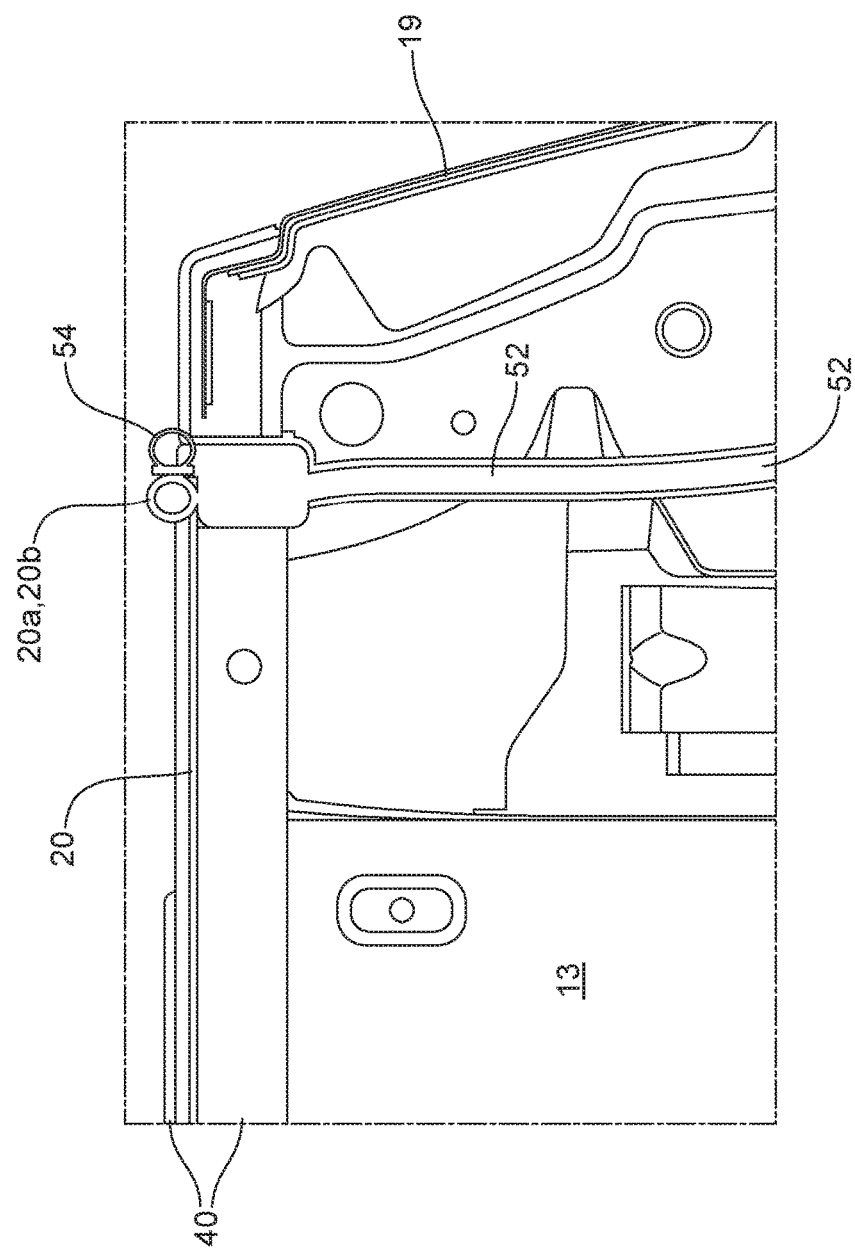

Turning to FIGS. 8 and 9, further aspects of the water management system are illustrated in relation to the tailgate 19. Specifically, a seal, such as a bulb seal 52, may be provided for sealing between the sidewalls 13, the floor 15, and the tailgate 19 when closed. Thus, as illustrated, the seal 52 may be substantially U-shaped. As perhaps best illustrated from FIG. 9, the upper end of the bulb seal 52 may be oversized and captured between the end of the guide rail 40 and the tailgate 19 when closed. A further seal, such as another bulb seal 54, may also extend along the upper portion of the tailgate 19, and may interface with the leading edge of the cover 20 when extended over the bed 12.

Figure 10:
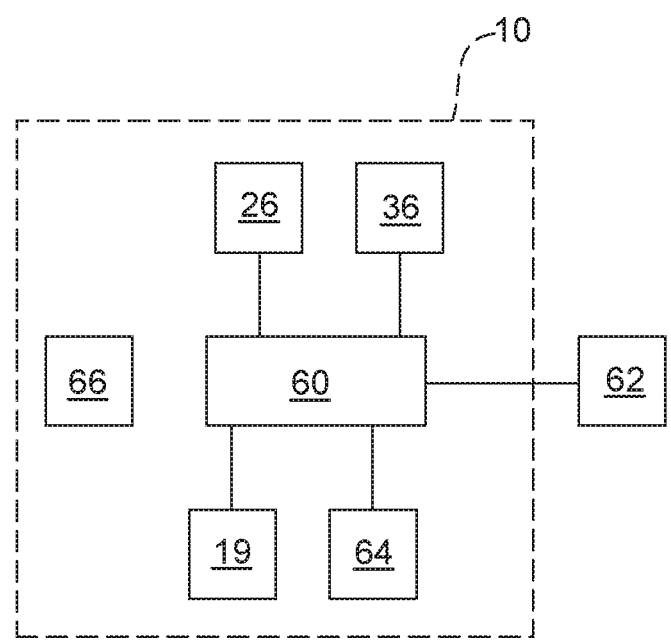
FIG. 10 is a schematic view illustrating a possible control arrangement for the flexible cover.

Control for activating the tonneau cover 20 may be provided in a variety of ways. As indicated in FIG. 10, a controller 60 may be associated with the pickup truck 10 and may be adapted for controlling the motor(s) 26, 36 to selectively extend or retract the cover 20. Input to the controller 60 may be provided by a remote control 62, such as a key fob, by an integrated input 64 within to the cab 10a or external to the cab, such as a pushbutton, or all of the above options may be implemented concurrently. The controller 60 may also be operative to turn on one or more lights 66 associated with the truck 10 (such as for illuminating the bed 12) when the cover 20 is activated to assist in visibility. The controller 60 may also automatically operate the motor(s) 26, 36 for retracting the cover 20 at least partially if it is extended when the tailgate 19 is activated for being lowered (such as by a handle or a powered lowering mechanism activated by the user), which may avoid wear on the associated seal. As can be appreciated, partial retraction of the cover 20 allows for the open space to be used for storage, similar to an open cargo compartment in a regular passenger vehicle.

According to a further aspect of the disclosure, the twin motors 26, 36 may communicate with each other in order to maintain a proper degree of tension on the cover 20 that is required to smoothly roll and unroll the fabric cover. This can be achieved with pulse width modulation (PWM), which assures the speed of the motors 26, 36 is matched.

Additionally, at the end of the close cycle, motor 26 driving the cables 28 connected to the cover 20 may be halted by controller 60, which may continue to operate the second motor 36 to rotate the roll 22 until a pre-determined condition (stall force, set time, rotational distance) is reached. This places tension onto the cover 20 to make it taut. The resulting taut fabric cover 20 increases stability and promotes water shedding.

In summary, a flexible, powered tonneau cover 20 with integral cross bows 20b to lend support may selectively cover a bed 12 of a pickup truck 10. To ensure reliable and repeatable operation, dual motors 26, 36 may extend and retract the cover 20 to or from a roll 22, with one motor using flexible cables 28 for closing or extending the cover and the other motor 26 rotating the roll to aid in retraction. A housing 24 for the motors 26, 36 and roll 22 formed by the retracted cover 20 may take the place of a front rail R connected to the front wall 14 forming part of the bed 12. A water management system associated with the cover 20 may include various seals 46, 52, 54 for preventing water from entering the bed 12 when the cover is deployed. Guide rails 40 may be secured to the sidewalls 13 of the bed 12 for guiding the cover, and may also be designed to facilitate water management. The control of the cover 20 may also be integrated with the truck 10 or remotely therefrom, and may also activate concurrently with other operations, such as lowering of the tailgate 19. A controller 60 may also control the first motor 26 to halt and the second motor 36 to continue to drive the roll 22 to pull the cover 20 taut in the extended or closed condition.

The foregoing description has been presented for purposes of illustration. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for selectively covering a pickup truck bed, comprising:
   a flexible cover extendable to at least partially cover the pickup truck bed and retractable to form a roll;
   a first motor for extending the flexible cover; and
   a second motor for driving the roll to retract the flexible cover, but not for use in extending the flexible cover.

2. The apparatus of claim 1, further including a flexible cable connected to the flexible cover, wherein the first motor is adapted for engaging the flexible cable to extend the flexible cover.

3. The apparatus of claim 2, further including a guide tube for at least partially receiving the flexible cable.

4. The apparatus of claim 1, further including at least one cross bow for supporting the flexible cover when extended over the pickup truck bed and forming part of the roll when the flexible cover is hilly retracted.

5. The apparatus of claim 4, wherein the at least one cross bow is secured within a pocket in the flexible cover.

6. The apparatus of claim 1, further including a flexible seal for sealing between a sidewall partially forming the pickup truck bed and the flexible cover.

7. The apparatus of claim 1, further including a cap for a sidewall partially forming the pickup truck bed, the cap providing a drain path for draining water away from the pickup truck bed.

8. The apparatus of claim 1, further including a controller for tying operation of the flexible cover to an operation of one or more of a light, a tailgate, a remote control, or a vehicle control.

9. The apparatus of claim 1, wherein a controller controls the first motor to halt and the second motor to continue to drive the roll to pull the cover taut in the extended condition.

10. A pickup truck including the apparatus of claim 1.

11. An apparatus for selectively covering a pickup truck bed, comprising:
    a flexible cover for extending in a travel direction to at least partially cover the pickup truck bed and retracting to at least partially expose the pickup truck bed, the flexible cover including at least one pocket;
    at least one support extending transverse to the travel direction secured at least partially within the pocket;
    a flexible seal for sealing between a sidewall partially forming the pickup truck bed and the flexible cover, and
    a motor for extending and retracting the flexible cover.

12. The apparatus of claim 11, wherein the support comprises a cross bow for supporting the flexible cover when extended over the pickup truck bed and forming part of a roll when the flexible cover is fully retracted.

13. The apparatus of claim 11, wherein the motor comprises a first motor for extending the cover, and further including a second motor for retracting the cover to form a roll, but not for use in extending the flexible cover.

14. A pickup truck including the apparatus of claim 11.

15. An apparatus for transporting cargo, comprising:
a pickup truck including a bed having a front wall adjacent to an operator's cab of the pickup truck;
a flexible cover for selectively extending to at least partially cover the pickup truck bed and at least partially retracting to form a roll including at least one support for supporting the flexible cover; and
a housing including the roll and connected to the front wall.

16. The apparatus of claim 15, further including a motor for extending the flexible cover, the motor being at least partially within the housing.

17. The apparatus of claim 15, further including a motor for rotating the roll, the motor being at least partially within the housing.

18. The apparatus of claim 15, further including sidewalls forming sides of the bed, and further including caps adapted for being secured to the sidewalls, the caps being adapted for guiding the flexible cover.

19. The apparatus of claim 18, wherein each cap includes a drain path for guiding water away from the bed.

20. The apparatus of claim 15, further including a controller for tying operation of the flexible cover to the operation of one or more of a light, a tailgate, a remote control, or a vehicle control.

* * * * *